United States Patent [19]

Miller

[11] 4,035,705
[45] July 12, 1977

[54] FAIL-SAFE DUAL CHANNEL AUTOMATIC PILOT WITH MANEUVER LIMITING

[75] Inventor: Harry Miller, Scottsdale, Ariz.

[73] Assignee: Sperry Rand Corporation, New York, N.Y.

[21] Appl. No.: 558,582

[22] Filed: Mar. 17, 1975

[51] Int. Cl.² ........................................... G05B 9/03
[52] U.S. Cl. ........................ 318/564; 318/566; 318/584; 318/8; 244/194
[58] Field of Search ......... 318/561, 563, 564, 565, 318/566, 584, 585, 8; 235/150.2; 244/194

[56] References Cited

U.S. PATENT DOCUMENTS

| | | | |
|---|---|---|---|
| 3,422,327 | 1/1969 | McBrayer et al. | 318/564 X |
| 3,454,852 | 7/1969 | Bourne et al. | 318/564 |
| 3,462,662 | 8/1969 | Carpenter | 318/565 |
| 3,493,836 | 2/1970 | Nelson | 318/565 |
| 3,504,248 | 3/1970 | Miller | 318/561 |
| 3,659,173 | 4/1972 | Pfersch | 318/584 |
| 3,679,956 | 7/1972 | Redmond | 318/564 |
| 3,807,666 | 4/1974 | Devlin | 235/150.2 X |
| 3,827,659 | 8/1974 | Feintach | 318/564 X |

*Primary Examiner*—Robert K. Schaefer
*Assistant Examiner*—John J. Feldhaus
*Attorney, Agent, or Firm*—Howard P. Terry; Albert B. Cooper

[57] ABSTRACT

Two substantially identical servo channels, coupled through a differential mechanism, position an attitude control surface of an aircraft in response to a common command signal applied to both channels. The common command is coupled to each channel through separate displacement and rate limiting devices to limit the attitude displacement and rate of change of attitude commands about the associated aircraft axis. In the pitch axis a separate normal accelerometer controls each command rate limit so as to prevent excessive pitch maneuvers due to the common command source. Redundant polarity comparators are included for comparing the polarity of the incremental load factor with the polarity of each servo channel output and for applying a brake to clamp the output of a failed servo channel when the polarity of the incremental load factor agrees with the servo motion direction and the incremental load factor exceeds a predetermined level, thus allowing the valid servo to assume control of the aircraft for a limited time until the pilot disconnects the system in response to monitoring circuits which operate alerting devices.

33 Claims, 3 Drawing Figures

FAIL-SAFE DUAL CHANNEL AUTOMATIC PILOT WITH MANEUVER LIMITING

BACKGROUND OF THE INVENTION

1. Field of the Invention

The present invention relates to control systems, particularly with regard to dual channel flight control systems for positioning attitude control surfaces.

2. Description of the Prior Art

As is known, aviation regulatory agencies such as the FAA impose safety requirements on the performance of automatic flight control systems. For example, with regard to the aircraft pitch axis, should a hard over malfunction occur the change in load factor of the aircraft must be limited to values which are typically in the range of plus or minus 1. When the aircraft is flying in a straight line, the load factor N is unity. Conventionally, accurate servo motor torque limiting is utilized to limit the servo motor torque to a value such that the maximum permitted load factor change would not be exceeded at the most critical flight condition of the aircraft. Typically, servo authority may be established on the basis of the high speed regime of the aircraft with an aft center of gravity. Present day requirements in some instances are even more stringent and require that the maximum load factor not be exceeded due to a hard over malfunction in a particular direction when the automatic pilot is holding the pitch attitude control surface at its maximum authority limit in the opposite direction as might occur due to a mistrimmed craft condition. Since conventional torque limiting is designed for a single flight condition, the prior art practice severely limits performance at other flight conditions. In general, performance under other conditions which require greater servo authority than that provided by the torque limit is seriously compromised. Typically such a compromised condition would exist at low speeds with a forward center of gravity such as might exist under approach conditions. Thus, although excessive load factor maneuvers are prevented, performance of the aircraft over portions of its flight envelope are seriously jeopardized.

Performance of such prior art systems are therefore sensitive to changes in aircraft configuration such as changes in speed, center of gravity position, flap-slat position, horizontal stabilizer position, changes in variable geometry aerodynamic control surface configurations and the like. Some prior art systems utilize monitor circuits to enable increased torque to be utilized. Such systems are, however, sensitive to nuisance disconnects or false alerts.

SUMMARY OF THE INVENTION

A primary object of the prsent invention is to obtain an automatic flight control system that provides safe and effective servo authority over the entire flight operating envelope of the aircraft including changes in variable geometry aerodynamic control surface configurations without requiring accurate servo torque limiting thus providing an automatic flight control system that will limit maneuvers due to malfunctions to safe values throughout the flight regime of the aircraft without compromising performance, and also will not be sensitive to nuisance warnings and disconnects.

This object is achieved by utilizing a dual channel servo system, the dual output thereof being combined in a mechanical summing device to position the attitude control element of the aircraft in response to a common command signal applied to both channels. The dual channel system is configured whereby movement of the attitude control surface caused by a failure in one of the channels is compensated by movement of the output of the other servo channel to minimize undesired maneuvers of the craft. The common command signal is applied to the channels through dual displacement and command rate limiters to limit undesired maneuvers of the craft when a failure occurs in the common command signal source of any part of the system which has dual redundant elements of the command paths.

In the pitch axis a separate normal accelerometer is utilized in each channel to vary the command rate limit of the respective channel in decreasing relationship with respect to the incremental load factor of the aircraft. As a further feature, a brake is included on the output of each of the servo motors and is applied to the invalid servo when the magnitude of the incremental load factor exceeds a predetermined value and a polarity comparison between the incremental load factor of the aircraft and the direction of motion of the servo output indicates that a particular servo is invalid.

DESCRIPTION OF THE PREFERRED EMBODIMENT

The present invention is utilized with dual channel servo systems that combine the outputs of the two channels to position an attitude control surface of an aircraft in response to a common command signal applied to both channels. A property of such dual channel servo systems utilized advantageously in the invention is that motion of the attitude control surface that would be caused by a hard over failure in one channel is compensated by motion of the other channel such that the system fails in a safe and passive manner. Such systems may utilize either reversible or irreversible individual servo actuators whose outputs are combined by a motion summing mechanism.

The invention is most advantageously utilized with a dual channel servo system of the type disclosed in U.S. Pat. No. 3,504,248, issued Mar. 31, 1970 in the name of the present inventor, entitled "Dual Channel Servo System Having Torque Equalization", and assigned to the assignee of the present invention. As described in this patent, the failure compensation property is inherently obtained because the differential gear mechanism thereof is utilized at a reversible point in the system to combine and couple the motions of the two servo channels to the control surface. It is the property of a differential in a reversible mechanism that it will transmit the weaker of two torques when driven from two sources of torque such as servo motors. The failure compensating effect is also achieved by the servo position minor loop electrical feedback around both channels utilizing the sum of the individual channel outputs to provide rapid reaction of the valid servo to cancel motion of the invalid servo.

Figure 1A:
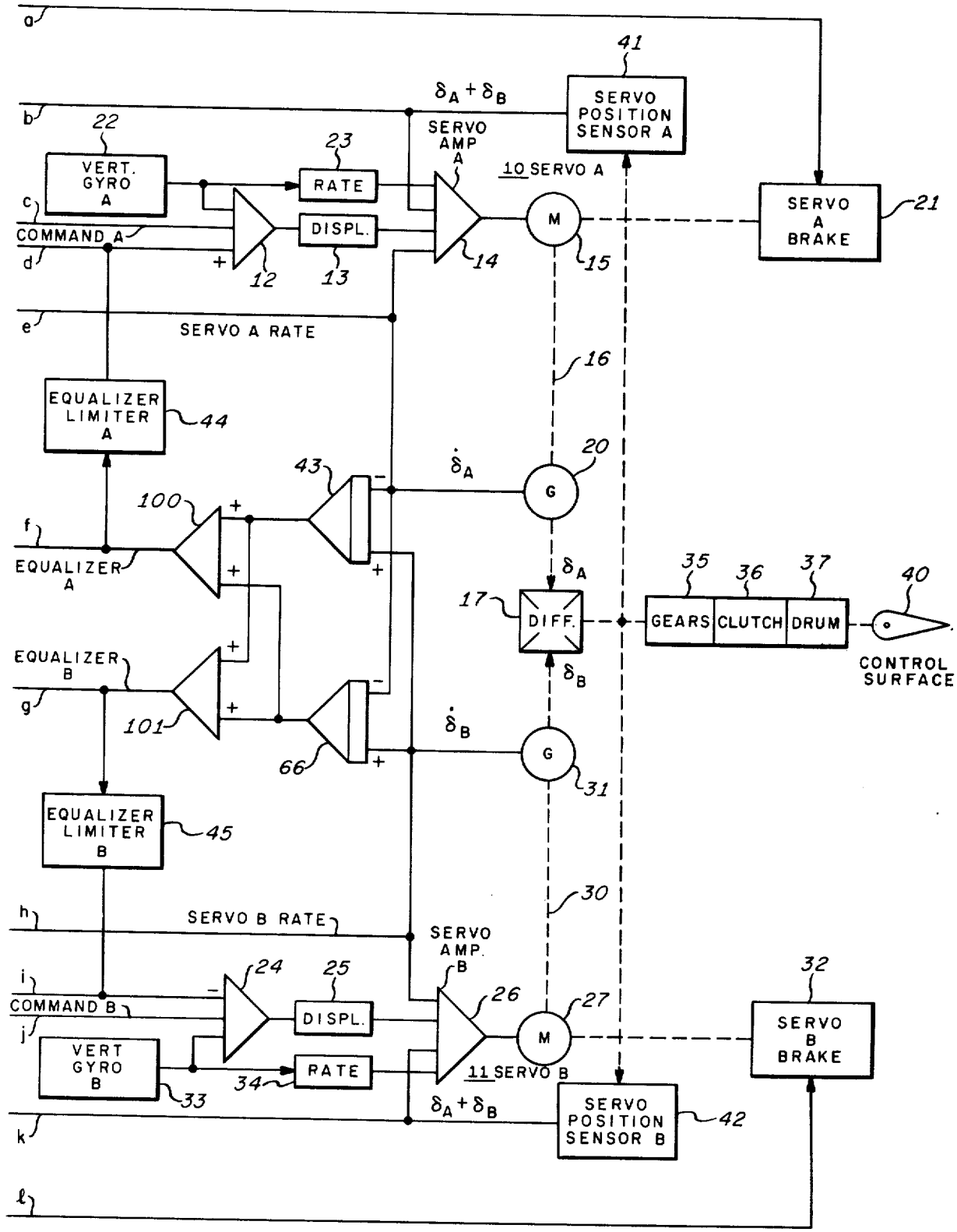
FIG. 1, comprised of FIGS. 1a and 1b, is a schematic block diagram illustrating the pitch axis of an automatic flight control system in accordance with the present invention. In considering FIG. 1.
FIG. 1b is positioned to the left of FIG. 1a to comprise the composite figure.

Although the present invention is advantageously applicable to provide a wide variety of control functions, the invention will be explained primarily in terms of the pitch axis of an aircraft and also with modifications preferably utilized for application in the roll axis of the craft. Referring to FIG. 1a, the dual channel servo system substantially as disclosed in said U.S. Pat. No. 3,504,248 is illustrated. Since the structure and operation of this system is fully described in said U.S. Pat. No. 3,504,248, it will only be briefly explained herein for continuity. The dual channel servo system is comprised of a first servo channel 10 and a second servo channel 11. Consistent with the nomenclature utilized in said U.S. Pat. No. 3,504,248, dual redundant elements associated with the first and second servo channels 10 and 11 respectively will have the respective reference characters "A" and "B" associated therewith. The servo channel 10 includes an amplifier 12 that receives a command A signal and provides the servo displacement gain through a controlling element 13 to a servo amplifier 14. The servo amplifier 14 drives a servo motor 15 which through a servo output shaft 16 provides an input to a reversible mechanical differential 17. The motion of the servo output shaft 16 is designated as $\delta_A$ as indicated by the legend. A tachometer generator 20 coupled to the shaft 16 measures the velocity of the output of the servo motor 15 as indicated by the legend $\dot{\delta}_A$. The velocity output of the tachometer generator 20 is applied in conventional rate feedback fashion to an input of the servo amplifier 14 and is also utilized for other purposes in accordance with the present invention in a manner to be later described.

The output shaft 16 of the servo channel 10 may be clamped by a brake 21 which may be instrumented as an electrical brake of a type which is spring released to its clamped position when the power is removed from the brake solenoid. The brake 21 may be of the type described in said U.S. Pat. No. 3,504,248 but is differently activated in accordance with the present invention in a manner to be hereinbelow described. A vertical gyroscope 22 provides attitude displacement stabilization signals to the amplifier 12 and attitude rate stabilization signals to the amplifier 14 via a rate taking circuit 23 in a manner well understood in the art of automatic flight control systems.

The servo channel 11 includes respective dual redundant components substantially identical to the components 12-16 and 20-23 of the servo channel 10 and are designated by reference numerals 24-27 and 30-34 respectively.

The mechanical differential gear 17 algebraically sums the motions of the output shaft 16 and 30 of the servo motors 15 and 27 respectively and provides the summed motion through power gears 35, an electric clutch 36 and a cable drum 37 to a control surface 40 in a conventional manner as described in said U.S. Pat. No. 3,504,248.

The net output of the duplex servo from the differential gear 17 is measured redundantly by servo position sensors 41 and 42 that are coupled to the output of the differential gear 17 by an appropriate mechanical coupling. The position sensors 41 and 42 may be of the type described in detail in said U.S. Pat. No. 3,504,248. The output of each of the sensors 41 and 42 represents the algebraic sum of the motions of the two servo motors 15 and 27 as indicated by the legend $\delta_A + \delta_B$ in the drawings. These signals are utilized as independent servo position feedback signals to the servo channels 10 and 11 respectively through the servo amplifiers 14 and 26. These servo position signals from the sensors 41 and 42 are also utilized in accordance with the present invention in a manner to be later described.

A significant characteristic of the reversible mechanical differential gear 17 having two sources of torque applied to the inputs thereof from the servo output shafts 16 and 30 is that the differential gear 17 equalizes the net torque output requiring each of the motors 15 and 27 to generate nearly identical values of torque as seen at the differential 17. Should one servo tend to generate more torque than the other, the differential 17 causes the motors 15 and 27 to rotate at different speeds. An active failure, such as a hard over failure, in one of the redundant elements of the system results in a passive-failed output to the control surface 40. This output is the result of the minor loop servo position feedback of the valid channel from the associated sensor 41 or 42 which rapidly cancels the servo motion of the failed channel causing the servo motors 15 and 27 to rotate in opposite directions. The torque equalizing effect of the reversible differential 17 as discussed above, also contributes to this desirable property. A passive failure in one of the redundant elements of the system results in correct but much reduced output due to the operation of the valid channel. This occurs because under a passive failure the reaction torque provided by the failed channel to the differential 17 is much reduced and the valid channel then tends to back drive the failed channel servo motor resulting in the reduced output to the control surface 40. The net output of the system is not zero because the back-driven failed servo generates reaction torque due to factors such as back EMF, windage and friction. The malfunction is detectable, however, in a manner to be described herein below because the valid servo motor back drives the passively failed servo motor resulting in motor speeds which are of opposite polarity. A mechanical blockage of either servo channel will result in the correct net output to the control surface 40 due to operation of the valid channel, the malfunction again being detectable in a manner to be explained hereinbelow because the velocities of the two servos do not track each other. The operation and failure characteristics of the dual channel servo system illustrated in FIG. 1a is described in detail in said U.S. Pat. No. 3,504,248 and will not be further explained herein for brevity.

The inherent torque equalization characteristics of the dual servo configuration as explained above and in said U.S. Pat. No. 3,504,248 may cause equal and opposite rotations of the motors 15 and 27 in the presence of normally expected spurious signals due to servo amplifier unbalance and differences in the gradients and nulls of the stability and path command signals of the two channels. The degree of unbalance normally expected can be of such magnitude as to result in full speed output of the motors 15 and 27 in opposite directions with respect to each other, thus resulting in total loss of control authority of the system. Electrical equalization generally of the type described in said U.S. Pat. No. 3,504,248 is utilized between the two channels in a manner which requires the motors 15 and 27 to track each other with regard to speed and direction thereby providing adequate control authority. Accordingly, the outputs of the tachometer generators 20 and 31 are applied as inputs to redundant equalization integrators 43 and 66 in such a manner that two signals are provided which represent the integral of the difference between the signals $\delta_A$ and $\delta_B$. The outputs of the equalization integrators 43 and 66 are summed in amplifiers 100 and 101 respectively, to provide separate equalization signals designated as EQUALIZER A and EQUALIZER B in the diagram. The output of summing amplifier 100 is limited by circuit 44 and applied to an input of amplifier 12. In a similar manner the output of summing amplifier 101 is limited by circuit 45 and applied as an input to the amplifier 24. The polarities of the equalizing signals applied to the amplifiers 12 and 24 are chosen with regard to the polarity of the difference taken at the equalization integrators 43 and 66 such that the speeds and directions of rotation of the motors 15 and 27 are forced to track each other as long as the equalization signals are within specified values as determined by the two independent limiters 44 and 45, the values of the limiters being set to account for normal tolerances in the two redundant channels.

A malfunction is indicated when either of the equalization signals exceeds the specified limit value in a manner to be explained.

Figure 1B:
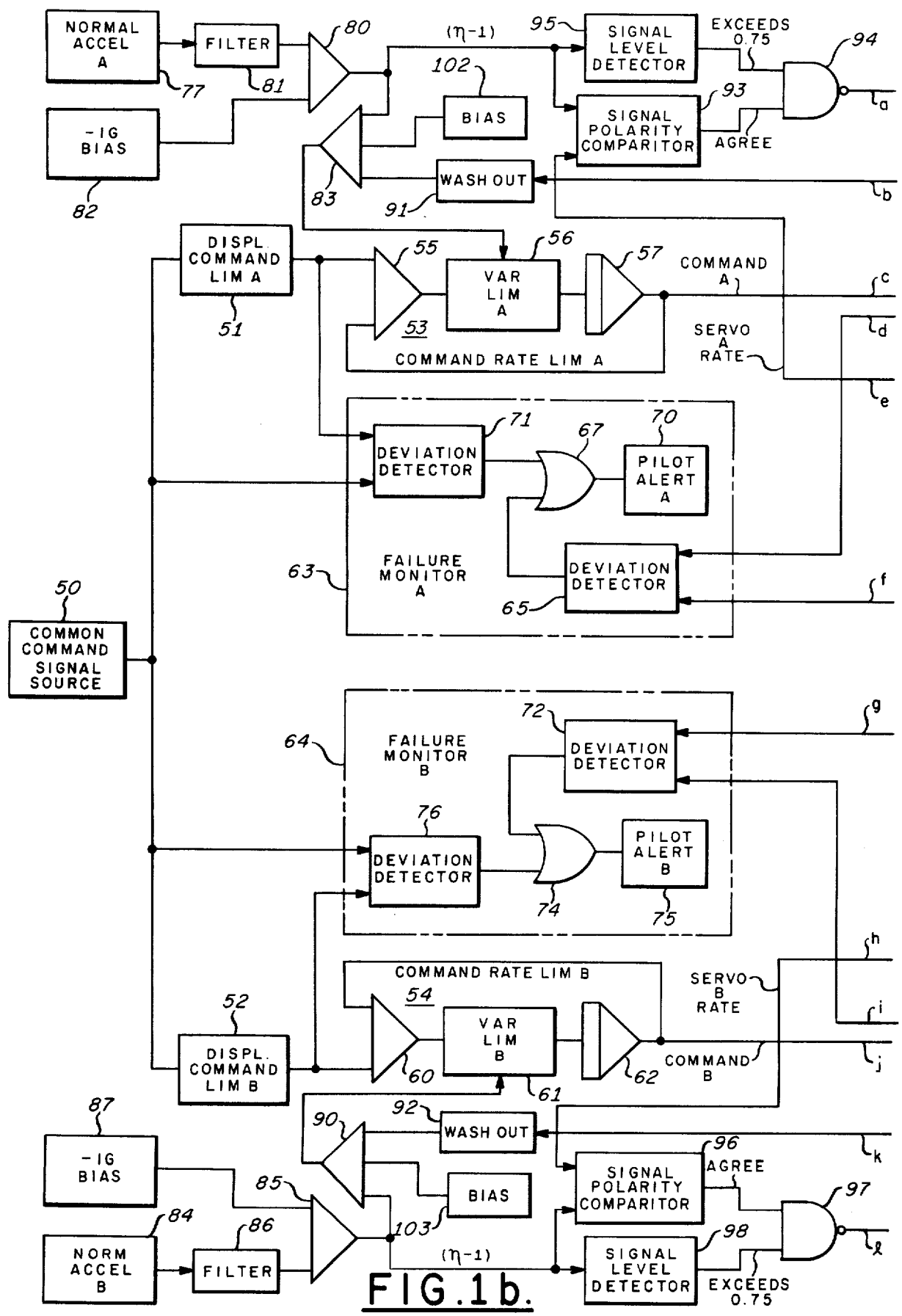

Referring now to FIG. 1b, the components utilized in the preferred embodiment of the invention with regard to the pitch axis of an aircraft are illustrated. A single common command input signal provided by a command signal source 50 is utilized to provide a common command to each of the dual servo channels. Hard over malfunctions in the command signal source 50 are controlled by redundant processing of the common command signal input prior to insertion into the amplifiers 12 and 24 (FIG. 1a) as command A and command B. The command signals for the dual servo channels are limited in amplitude in displacement command limiters 51 and 52 respectively thereby limiting the attitude displacement of the aircraft in response to the common command signal. Numerous suitable limiter circuits are known in the art for use in the disclosed embodiment. If either command limiter 51 or 52 should malfunction, the system will only respond to that channel which calls for the least servo torque, as previously described.

The dual redundant displacement limited command signals from the limiters 51 and 52 are applied to command rate limiters 53 and 54 respectively. The limiters 53 and 54 limit the rate of change of the command input signal thereby limiting the rate of change of attitude of the aircraft in response to the command signal. The command rate limiter 53 is comprised of an amplifier 55 to which the displacement limited command signal from the limiter 51 is applied. The output from the amplifier 55 is applied through limiter circuit 56 to the input of an integrator 57. The output of the integrator 57 is connected in negative feedback fashion as an input to the amplifier 55. Thus it is appreciated that the command rate limiter 53 comprises a followup circuit on the signal provided from the limiter 51, the output from the integrator 57 changing in a linear fashion until the output thereof is equal to the signal from the limiter 51, the rate of change of the output of the integrator 57 being determined by the limiter circuit 56. The limiter 56 may, for example, be instrumented as a fixed limiter circuit to the integrator 57 in which case the maximum rate of change of the command will be a constant value. This is the configuration used when applied to the roll axis. Alternatively, the limiter 56 may operate as a variable function, being controlled by the output of an amplifier 83 and thereby providing means for adjusting the limit.

Figure 2:
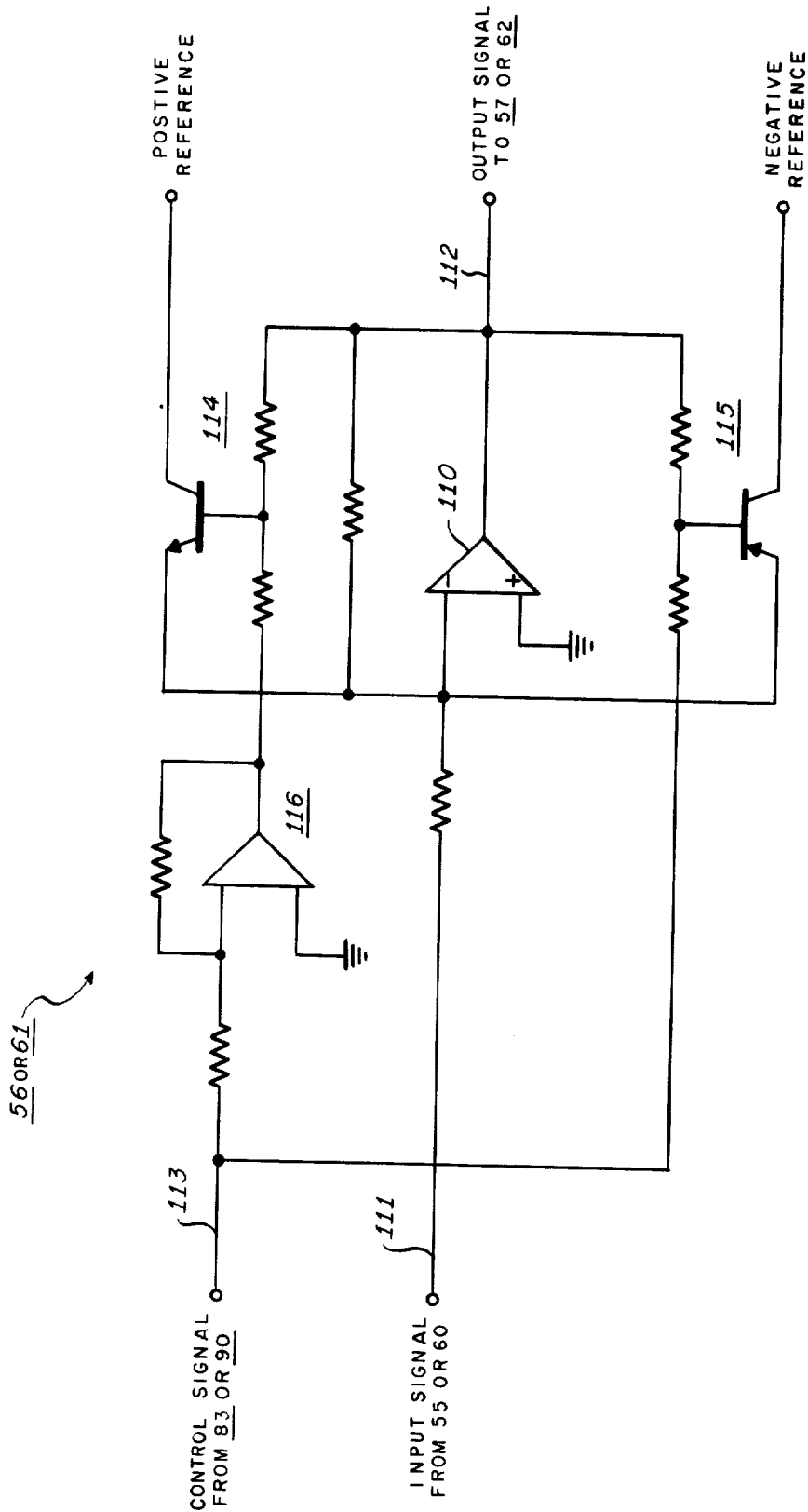
FIG. 2 is a schematic wiring diagram illustrating a typical variable limiter circuit for use in FIG. 1.

Referring now to FIG. 2, a typical and well known variable limiter circuit is illustrated whereby the signal at the output 112 of the limiter will track the signal at the input 111 in magnitude and polarity through amplifier 110 until transistor circuit 114 or 115 becomes conductive. Under these conditions the output 112 will remain at a fixed value even though the input may continue to increase. The value at which the limiting action becomes effective is a function of the magnitude of the control signal at 113. Since the signal at the input 111 may reverse polarity during normal operation it is necessary to utilize two transistor circuits and a polarity inverting circuit 116 to obtain proper limiting regardless of the polarity of the input signal 111.

Referring again to FIG. 1b, the output of the amplifier 83 provides the control signal for the variable limiter circuit 56. The magnitude of the output of amplifier 83 is determined by a combination of signals representing the deviation of aircraft load factor $\eta$ from unity value, a bias voltage from 102 and a stabilizing signal derived from the position sensor 41 operating through a washout circuit 91. The incremental load factor signal ($\eta$-1) is generated at the output of an amplifier 80, which in turn is derived from a normal accelerometer 77, a filter 81 and a (-1g) bias voltage source 82. The signals that comprise the pitch rate command limit is at a higher value when the incremental load factor is low compared to its value when the incremental load factor is high. The washed out servo position signal provides anticipation of load factor change and thus ensures stable and smooth control of the pitch maneuver resulting from a step command at source 50. The range of outputs from amplifier 83 over the flight regime of the aircraft is such that the resulting incremental load factor due to any step command never exceeds a predetermined vlaue such as 0.65. It is important that the incremental load factor response to a pitch command be less than the threshold value set in a signal level detector 95 which is typically set at a value of 0.75. The purpose of the threshold detector 95 is to allow the aircraft autopilot to respond to externally applied gusts which cause incremental load factors which have a polarity opposite to that of the response of the servo since the servo operates to reduce the load factor because of the stabilization portions of the servo channels derived from the vertical gyro. On the other hand, servo reactions to maneuvering commands cause load factors which have a polarity which is consistent with the polarity of the servo response.

The output from the integrator 57 is the displacement and rate limited command A applied as the input command signal to the servo channel 10. In a similar manner the command rate limiter 54 is comprised of and controlled by components 60, 61, 62, 84, 85, 86, 87, 90, 92 and 103 comparable to the components 55, 56, 57, 77, 80, 81, 82, 83, 91 and 102 respectively of the command rate limiter 53 and the control circuits therefor and applies the command B input signal to the servo channel 11.

Failure monitors 63 and 64 will detect an operational discrepancy between servo channels 10 and 11 and alert the pilot by warnings 70 and/or 75. The failure monitors 63 and 64 are dual redundant to ensure operation in the event of any single failure. The monitors include level detectors 65 and 72 which are coupled to the inputs and outputs of equalizer limiters 44 and 45. Either monitor will detect an operational discrepancy between the servo channels when the equalizer signal from amplifier 100 or 101 exceeds a predetermined limit value. The outputs of deviation detectors 65 and 72 operate pilot alert circuits 70 and 75 through OR circuits 67 and 74, respectively. Similar deviation detectors 71 and 76 are coupled to displacement command limiters 51 and 52 and will also operate pilot alerts 70 and 75 should the common command source 50 exceed a predetermined limit value. The pilot alert devices 70 and 75 provide warnings to the pilot, for example, by warning lights or aural warning signals. The deviation detectors 65 and 72 include time delay devices (not shown) to inhibit operation of the pilot alerts 70 and 75 if the equalizer signals do not remain above the limit values for specified minimum time intervals. The purpose of the time delay is to eliminate nuisance warnings.

During normal operation of the dual channel servo system illustrated in FIG. 1 the speeds of the two motors 15 and 27 track each other in magnitude and direction. In the event of a malfunction in one of the redundant channels the motor speeds no longer track each other. The difference in signals provided by the tra- chometer generators 20 and 31 will cause the equalizer signals to exceed a preset value and operate pilot alerts 70 or 75 which operate through deviation detectors 65 and 72 to warn the pilot of an automatic flight control system malfunction. An urgent requirement does not exist to immediately disconnect the system because of the fail-safe characteristics of the system of the present invention. It will be appreciated that requirements for fail-safe deviation detectors, OR circuits and pilot alert warnings are minimized because dual redundant elements are utilized. Either the monitor 63 or the monitor 64 can provide a warning, each completely independent from the other. A hard over malfunction in the common command source 50 is detected in the level detectors 71 and 76 via the difference in signals between the input and output of the displacement command limiters 51 and 52 respectively which differences are utilized to alert the pilot that normal maximum attitude commands are being exceeded. These signals operate the pilot alert devices 70 and 75.

The system described hereinabove is applicable for utilization in both the roll and pitch axes of an aircraft. In the roll axis the brakes 21 and 32 are not utilized and the limit circuits 56 and 61 of the command rate limiters 53 and 54 respectively are not variable and thus provide a fixed command rate limit with regard to the roll axis. Thus a hard over malfunction in the common command signal source 50 provides a roll rate limited maneuver in the roll axis. In the pitch axis the brakes 21 and 32 are utilized and applied in a manner to be described and the limit circuits 56 and 61 are adjustable in accordance with functions that have been described and are elaborated further in the following discussion.

As explained above, in the pitch axis the blocks 56 and 61 limit the pitch rate of the aircraft in accordance with the characteristics of limit circuits 56 and 61 and the control signals from amplifiers 83 and 90. The deviation in load factor experienced by the aircraft due to pitch command is a function both of the pitch rate and the airspeed of the aircraft. Thus for approach speeds a pitch rate that would result in a acceptable load factor increment would result in an excessive load factor maneuver in the high speed cruise regime of the craft. In order to restrict the incremental load factor to an acceptable value through the entire flight regime of the craft. In order to restrict the incremental load factor to an acceptable value through the entire flight regime of the aircraft, the limit function of the circuits 56 and 61 are adjusted downward as a function of the incremental load factor of the aircraft. To this effect the servo channel 10 has associated therewith the normal accelerometer 77 whose output is applied as an input to the amplifier 80 via the noise filter 81. The $-1g$ bias signal is applied from the source 82 as another input to the amplifier 80. Thus the output of the amplifier 80 is representative of the incremental load factor ($\eta-1$) experienced by the aircraft due to craft pitch maneuvers. The output of the amplifier 80 is applied as an input to the amplifier 83 whose output in turn is connected to the variable limiting device 56 that was described in relation to the typical circuit shown in FIG. 2. This will vary the command rate limiter 53 as a decreasing function of the incremental load factor experienced by the aircraft. For a particular characteristic of the signal from amplifier 83 it was found that a maximum pitch rate of 2.8° per second resulted in an incremental load factor of 0.3 at a true airspeed of 120 knots. The signal characteristic was such that the pitch rate limit was reduced to 1.4° per second at 500 knots in order to limit the incremental load factor to 0.65. To accomplish this the pitch rate command limit controlled by the limiter 53 was arranged to follow the control law:

$\dot{\theta}_{c_{lim}} = (8 - 4\eta)$ degrees per second where $\eta$ is the normal load factor existing on the aircraft and whose value is unity during straight flight.

In a substantially identical manner the variable limit circuit 61 of the command rate limiter 54 for the servo channel 11 is adjusted by the components 84, 85, 86 87 and 90 corresponding to the elements 77, 80, 81, 82 and 83 respectively.

When the above pitch rate command law was utilized with a particular aircraft, the servos and elevator exhibited an oscillatory response to an input step command. This oscillation is damped by utilizing a function of servo position and in particular by utilizing washed out servo deflection, as discussed above, as an adjunct to the above given control law as follows:

$$\dot{\theta}_{c_{lim}} = \left[ 8 - 4\eta - \left( \frac{\tau S}{\tau S + 1} \right) \delta_r \right] \text{degrees per second}$$

where $\tau$ is the time constant of the wash out circuit and is typically 0.25 seconds. To implement this damping function in the servo channel 10 the wash out circuit 91, responsive to the net servo position signal from the sensor 41, provides an input to the amplifier 83. The bias voltage 102 is added to provide the equivalent of the constant value of 8° per second of the control law. The wash out circuit 91 together with bias voltage 102 and the output of amplifier 80, which reflects the incremental load factor ($\eta$-1), provides the control signal which adjusts the variable limit of circuit 56. Thus it is appreciated that the wash out circuit 91 and the amplifier 83 comprises a circuit for combining the servo position signal from the sensor 41 with the incremental load factor signal from the amplifier 80 to provide a combined signal to adjust the limit of the block 56. In a similar manner a wash out circuit 92 provides the redundant oscillation damping function in the servo channel 11. As discussed, the purpose of the normal accelerometers 77 and 84 is to modify the authority of the duplex servo and its command circuitry to limit pitch maneuvers in the event of failure so that the incremental load factor values do not exceed a typical value such as 0.75 over the speed range of the aircraft.

A passive failure of one of the normal accelerometers 77 and 84 will inhibit automatic reduction in pitch command rate in that servo channel associated with the failed accelerometer. The effect of such a failure is an unsymmetrical processing of the commands to channels A and B respectively. That channel which calls for the least servo torque will control the resulting maneuver as discussed previously. The net servo response is proper since it is governed by the valid channel. The monitors 63 and 64 will operate, however, because dissimilar outputs from the tachometer generators 20 and 31 cause the equalizing signals to increase beyond the limit values established by circuitry 44 and 45.

A hard over failure of one of the normal accelerometers 77 and 84 will cause excessive reduction in the pitch command rate limiting in the channel associated with the failed accelerometer. The result will be a much reduced response to the command since the servo will be governed by that channel which requires the least servo torque. The sluggish response is also accompanied by operation of the monitors 63 and 64 thus providing an alert, such as a visual alert, to the pilot indicating improper automatic pilot performance.

The elevator channel of the aircraft is often in relatively steady state condition where maximum autopilot authority elevator deflection will result, such as during flap confirmation changes and lift compensation during steep bank angle turns. Conventionally, a hard over malfunction in a direction opposite to that being held by the automatic pilot causes a hard over elevator deflection in the opposite direction resulting in a pitch maneuver which produces twice the incremental load factor of the same malfunction if it were to have occurred at a time when the elevator was in a trimmed condition. The embodiment of the present invention as illustrated in FIG. 1 limits the pitch maneuver to a safe incremental load factor value without the use of conventional servo torque limiting even under the severe condition described. This is achieved by selectively activating either of the previously described brakes 21 and 32 to clamp the failed servo channel and allowing the valid servo channel to take over control.

The logic circuitry utilized for clamping the appropriate brake is again dual redundant. The circuitry associated with the servo channel 10 comprises a polarity comparator 93 responsive to the servo rate signal provided from the tachometer generator 20 and further responsive to the incremental load factor signal provided from the amplifier 80. When the polarity of motion from the servo motor 15 agrees with the polarity of the incremental load factor of the aircraft as sensed by the accelerometer 77, the polarity comparator 93 provides an input to a NAND gate 94. The other input to the NAND gate 94 is provided from the level detector 95 responsive to the incremental load factor signal from the amplifier 80. The level detector 95 provides an input to the NAND gate 94 when the incremental load factor experienced by the aircraft exceeds a predetermined level, for example, 0.75. The output of the NAND gate 94 is coupled to the brake 21 to cause application thereof when the polarity comparator 93 provides a polarity agreement signal in coincidence with the incremental load factor of the aircraft exceeding the predetermined level of the level detector 95. The servo channel 11 has associated therewith substantially identical components 96, 97 and 98 comparable to the components 93, 94 and 95 respectively.

Thus the logic utilized for clamping the brake associated with the invalid servo channel comprises a polarity comparison between the aircraft incremental load factor and the servo rate in coincidence with a signal level detection with regard to the incremental load factor. The logic is such that the invalid servo channel is identified as that servo whose direction of rotation is consistent with the polarity of the incremental load factor being produced on the aircraft. When this condition occurs in coincidence with the incremental load factor exceeding a preset value, typically 0.75, the invalid servo is clamped via the associated brake permitting the valid servo to resume normal operation to return the elevator surface to its original position thus limiting the pitch maneuver to a safe value. The preset value is set below unity in order to permit some filtering via the filters 81 and 86 of the normal acceleration signal which usually contains spurious high frequency signals because of structural vibration and because of a time delay associated with operation of the brake. While the operation of the single valid channel will appear to be normal, the pilot alert devices 70 and 75 will energize because the tachometer generator output of the valid channel will not track that of the clamped servo.

When a hard over malfunction occurs the valid servo channel initially responds to cancel the motion of the malfunctioning servo thus actuating the servo brake under the conditions discussed above. When the invalid servo is clamped the valid servo immediately operates to stop the build up of the load factor and returns the system to its original trimmed elevator configuration. During the maneuver the maximum incremental load factor experienced by the aircraft is contained within the predetermined limits.

It will be appreciated that the automatic pilot system described hereinabove provides fail safe performance and will limit maneuvers due to malfunctions to safe values throughout the flight regime of the aircraft without comprising performance. The invention eliminates the necessity for conventional servo motor torque limiting which is designed for a single flight condition and thus severely limits performance at other flight conditions. The elimination of torque limiting insures good performance at approach speeds and forward center of gravity position and is insensitive to aircraft configuration changes such as speed, center of gravity position, horizontal stabilizer position and flap-slat position. The system is also insensitive to nuisance disconnects or alerts that are characteristic of systems that utilize a single active channel with a monitor. The above described system permits any single failure to occur without requiring immediate or automatic disconnect of the system but instead provides a warning, such as a visual warning, to alert the pilot that a malfunction has occurred leaving the disconnect decision to the pilot. Thus tha above described system is failsafe for any single malfunction in that the resulting maneuver will not exceed preset incremental load factor limits such as, for example, unity.

Although the preferrred embodiment of the invention was described in terms of utilization in aircraft, it will be appreciated that the invention is also applicable to other navigable craft such as space craft and marine vehicles. The invention was described in terms of reversible electromechanical servo motors positioning the control surface through a mechanical differential at a reversible point in the system. It will be appreciated that other servo configurations such as electrohydraulic servos that provide linear motion through a lever summing mechanism may also be utilized using the combined servo output as the minor loop feedback for each channel providing the desirable failure compensation features discussed above.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A control system for controlling the movement of the pitch attitude control surface of an aircraft comprising
 a common command signal source,
 first and second substantially identical servo channels coupled to said common command signal source for providing first and second servo outputs respectively in response to said common command signal,
 summing means responsive to said first and second servo outputs and coupled between said first and second servo channels and said pitch attitude control surface for controlling the movement thereof in accordance with the algebraic sum of said first and second servo outputs,
 feedback means responsive to said first and second servo outputs for providing feedback signals to said first and second servo channels,
 whereby movement of said pitch attitude control surface caused by a failure in one said servo channel tends to be compensated by movement of the output of the other said servo channel to minimize undesired maneuvers of said aircraft,
 first and second limiter means coupled between said common command signal source and said first and second servo channels respectively for limiting said common command signal in each said channel to minimize undesired maneuvers of said craft when a failure occurs in said common command signal source,
 said first and second limiter means each comprising rate limiter means for limiting the rate of change of said command signal applied to said first and second servo channels respectively, thereby limiting the rate of change of attitude of said craft in response to said command signal, and
 first and second normal accelerometer means for providing respective incremental load factor signals representative of the incremental load factor on said aircraft.

2. The control system of claim 1 in which said first and second limiter means each further includes displacement limiter means for limiting the magnitude of said command signal applied to said first and second servo channels respectively thereby limiting the attitude displacement of said craft in response to said command signal.

3. The control system of claim 1 in which said first and second rate limiter means includes first and second adjusting means responsive to said first and second incremental load factor signals respectively for adjusting said rate of change of said command signal in a decreasing relationship with respect to said incremental load factor of said aircraft.

4. The control system of claim 1 in which said first and second servo channels further include
 first and second brake means for clamping said first and second servo outputs respectively, and
 first and second polarity signal generator means responsive to said first and second servo outputs respectively for providing respective first and second servo polarity signals representative of the directions of motion thereof respectively.

5. The control system of claim 4 further including first and second polarity comparator means responsive to said respective first and second incremental load factor signals and to said respective first and second servo polarity signals for providing respective first and second polarity comparison signals, said first and second brake means being responsive to said respective first and second polarity comparison signals for selectively applying said brake means associated with a failed one of said servo channels in accordance with the polarity comparison between the directions of motion of said failed servo channel and said incremental load factor of said aircraft.

6. The control system of claim 5 further including
 first and second incremental load factor level detector means responsive to said first and second incremental load factor signals respectively for providing respective outputs when said incremental load factor of said aircraft exceeds a predetermined level, and
 first and second coincidence gate means responsive to said respective outputs of said first and second incremental load factor level detector means and to said respective first and second polarity comparison signals for providing first and second coincidence signals to said first and second brake means respectively for applying said brake means associated with said failed one of said servo channels in accordance with the polarity comparisons between the direction of motion of said failed servo channel and said incremental load factor of said aircraft in coincidence with said incremental load factor of said aircraft exceeding said predetermined level.

7. The control system of claim 3 including first and second servo position sensor means coupled to said summing means for providing respective first and second servo position signals in accordance with said algebraic sum of said first and second servo outputs.

8. The control system of claim 7 further including first and second combining means coupled to said first and second adjusting means respectively and responsive to said respective first and second servo position signals and to said respective first and second incremental load factor signals for adjusting said rate of change of said command signal in a decreasing relationship with respect to said incremental load factor of said aircraft and in accordance with a function of said algebraic sum of said first and second servo outputs.

9. The control system of claim 8 in which each said first and second combining means includes wash out circuit means responsive to said respective servo position signal for providing said function of said algebraic sum of said first and second servo outputs.

10. The control system of claim 7 in which said first and second servo position signals are further coupled to said first and second servo channels for providing said feedback signals thereto.

11. The control system of claim 2 in which said first and second servo channels further include first and second rate generator means responsive to said first and second servo outputs respectively for providing respective first and second servo rate signals representative of the rates of motion thereof respectively.

12. The control system of claim 11 further including equalizing integrator means responsive to said first and second servo rate signals for providing respective first and second equalizing signals each representative of the integral of the difference between said first and second servo rate signals, and first and second equalizer limiter means responsive to said first and second equalizing signals respectively for limiting the magnitudes thereof, said limited equalizing signals from said first and second equalizer limiter means being applied to said first and second servo channels respectively with opposite polarities with respect to each other in such a manner as to tend to diminish the difference in motion between said first and second servo outputs when said first and second servo outputs are moving in opposite directions relative to each other.

13. The control system of claim 12 further including first and second failure monitors each comprising equalizer signal level detector means responsive to said respective equalizing and limited equalizing signals for providing a failure signal when the difference therebetween exceeds a predetermined level, and a pilot alert indicator responsive to said failure signal for providing a failure indication in accordance with said difference exceeding said predetermined level.

14. The control system of claim 13 in which each said failure monitor further includes time delay means within said equalizer level detector means for delaying said failure indication for a predetermined time interval after said difference exceeds said predetermined level.

15. The control system of claim 13 in which each said failure monitor further includes displacement limiter level detector means responsive to said common command signal and to the output signal of a respective one of said displacement limiter means for providing a further failure signal when the difference between said common command signal and said output signal of said displacement limiter means exceeds a predetermined level, said pilot alert indicator being responsive to said further failure signal for further providing said failure indication when said difference between said common command signal and said output signal of said displacement limiter means exceeds said predetermined level.

16. The control system of claim 1 in which each said first and second servo channels comprises a reversible servo, and said summing means comprises differential gear means coupled between said first and second servo channels and said attitude control surface at a reversible point in said control system.

17. The control system of claim 4 further including first and second polarity comparator means responsive to said respective first and second incremental load factor signals and to said respective first and second servo polarity signals for providing respective first and second polarity comparison signals, said first and second brake means being responsive to said respective first and second polarity comparison signals for applying a selected one of said brake means associated with a failed one of said servo channels in accordance with agreement in the polarity comparison between the directions of motion of said failed servo channel and said incremental load factor of said aircraft.

18. The control system of claim 17 further including first and second incremental load factor level detector means responsive to said first and second incremental load factor signals respectively for providing respective outputs when said incremental load factor of said aircraft exceeds a predetermined level, and first and second coincidence gate means responsive to said respective outputs of said first and second incremental load factor level detector means and to said respective first and second polarity comparison signals for providing first and second coincidence signals to said first and second brake means respectively for applying said brake means associated with said failed one of said servo channels in accordance with said agreement in said polarity comparison in coincidence with said incremental load factor of said aircraft exceeding said predetermined level.

19. An automatic flight control system for controlling the movement of the pitch attitude control surface of an aircraft comprising a common command signal source, first and second substantially identical servo channels coupled to said common command signal source for providing first and second servo outputs respectively in response to said common command signal, summing means responsive to said first and second servo outputs and coupled between said first and second servo channels and said pitch attitude control surface for controlling the movement thereof in accordance with the algebraic sum of said first and second servo outputs, feedback means including first and second servo position sensor means coupled to said summing means for providing respective first and second servo position feedback signals to said first and second servo channels respectively in accordance with said algebraic sum of said first and second servo outputs, whereby movement of said pitch attitude control surface caused by a failure in one said servo channel tends to be compensated by movement of the output of the other said servo channel to minimize undesired maneuvers of said aircraft, first and second limiter means coupled between said common command signal source and said first and second servo channels respectively for limiting said common command signal in each said channel to minimize excess pitch maneuvers of said craft when a failure occurs in said common command signal source.

said first and second limiter means each comprising rate limiter means for limiting the rate of change of said command signal applied to said first and second servo channels respectively, thereby limiting the rate of change of the pitch attitude of said aircraft in response to said command signal, and first and second normal accelerometer means for providing respective incremental load factor signals representative of the incremental load factor on said aircraft.

20. The control system of claim 19 in which said first and second limiter means each further includes displacement limiter means for limiting the magnitude of said command signal applied to said first and second servo channels respectively thereby limiting the pitch attitude displacement of said aircraft in response to said command signal.

21. The control system of claim 20 in which said first and second rate limiter means includes first and second adjusting means responsive to said first and second incremental load factor signals respectively for adjusting said rate of change of said command signal in a decreasing relationship with respect to said incremental load factor of said aircraft.

22. The control system of claim 21 in which said first and second servo channels further include first and second brake means for clamping said first and second servo outputs respectively, and first and second rate generator means responsive to said first and second servo outputs respectively for providing respective first and second servo rate signals representative of the rates and directions of motion thereof respectively.

23. The control system of claim 22 further including first and second polarity comparator means responsive to said respective first and second incremental load factor signals and to said respective first and second servo rate signals for providing respective first and second polarity comparison signals, said first and second brake means being responsive to said respective first and second polarity comparison signals for applying a selected one of said brake means associated with a failed one of said servo channels in accordance with agreement in the polarity comparison between the directions of motion of said failed servo channel and said incremental load factor of said aircraft.

24. The control system of claim 23 further including first and second incremental load factor level detector means responsive to said first and second incremental load factor signals respectively for providing respective outputs when said incremental load factor of said aircraft exceeds a predetermined level, and first and second coincidence gate means responsive to said respective outputs of said first and second incremental load factor level detector means and to said respective first and second polarity comparison signals for providing first and second coincidence signals to said first and second brake means respectively for applying said brake means associated with said failed one of said servo channels in accordance with said agreement in said polarity comparison in coincidence with said incremental load factor of said aircraft exceeding said predetermined level.

25. The control system of claim 24 further including first and second combining means coupled to said first and second adjusting means respectively and responsive to said respective first and second servo position signals and to said respective first and second incremental load factor signals for adjusting said rate of change of said command signal in a decreasing relationship with respect to said incremental load factor of said aircraft and in accordance with a function of said algebraic sum of said first and second servo outputs.

26. The control system of claim 25 in which each said first and second combining means includes wash out circuit means responsive to said respective servo position signal for providing said function of said algebraic sum of said first and second servo outputs.

27. The control system of claim 26 further including equalizing integrator means responsive to said first and second servo rate signals for providing respective first and second equalizing signals each representative of the integral of the difference in magnitude between said first and second servo rate signals, and first and second equalizer limiter means responsive to said first and second equalizing signals respectively for limiting the magnitudes thereof, said limited equalizing signals from said first and second equalizer limiter means being applied to said first and second servo channels respectively with opposite polarities with respect to each other in such a manner as to tend to diminish the difference in motion between said first and second servo outputs when said first and second servo outputs are moving in opposite directions relative to each other.

28. The control system of claim 27 further including first and second failure monitors each comprising equalizer signal level detector means responsive to said respective equalizing and limited equalizing signals for providing a failure signal when the difference in magnitude therebetween exceeds a predetermined level, and a pilot alert indicator responsive to said failure signal for providing a failure indication in accordance with said difference exceeding said predetermined level.

29. The control system of claim 28 in which each said failure monitor further includes time delay means within said equalizer signal level detector means for delaying said failure indication for a predetermined time interval after said difference exceeds said predetermined level.

30. The control system of claim 29 in which each said failure monitor further includes displacement limiter level detector means responsive to said common command signal and to the output signal of a respective one of said displacement limiter means for providing a further failure signal when the difference between said common command signal and said output signal of said displacement limiter means exceeds a predetermined level, said pilot alert indicator being responsive to said further failure signal for further providing said failure indication when said difference between said common command signal and said output signal of said displacement limiter means exceeds said predetermined level.

31. The control system of claim 30 in which each said first and second servo channel comprises a reversible servo, and said summing means comprises differential gear means coupled between said first and second servo channels and said pitch attitude control surface at a reversible point in said control system.

32. The control system of claim 31 in which said first and second servo rate signals are further coupled to said first and second servo channels for providing further feedback signals thereto.

33. The control system of claim 32 in which each said first and second rate limiter means comprises
an integrator,
an algebraic subtracting circuit resonsive to said common command signal and coupled to receive the output of said integrator for providing the algebraic difference therebetween, and
limit control means coupling the output of said subtracting circuit to the input of said integrator and coupled to the output of said respective combining means for controlling the gain of said integrator,
said limit control means comprising said adjusting means.

\* \* \* \* \*